US011573989B2

(12) United States Patent
Bailey et al.

(10) Patent No.: US 11,573,989 B2
(45) Date of Patent: Feb. 7, 2023

(54) CORPUS SPECIFIC GENERATIVE QUERY COMPLETION ASSISTANT

(71) Applicant: Microsoft Technology Licensing, LLC, Redmond, WA (US)

(72) Inventors: Peter Richard Bailey, Canberra (AU); David Anthony Hawking, Canberra (AU); Mark Blelock Atherton, Lymington (GB); Nicholas E. Craswell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1310 days.

(21) Appl. No.: 15/442,514

(22) Filed: Feb. 24, 2017

(65) Prior Publication Data
US 2018/0246896 A1    Aug. 30, 2018

(51) Int. Cl.
*G06F 16/33* (2019.01)
*G06F 16/36* (2019.01)
*G06F 16/95* (2019.01)
*G06F 16/332* (2019.01)
(Continued)

(52) U.S. Cl.
CPC ........ *G06F 16/3322* (2019.01); *G06F 16/334* (2019.01); *G06F 16/335* (2019.01); *G06F 16/3329* (2019.01); *G06F 16/367* (2019.01); *G06F 16/951* (2019.01)

(58) Field of Classification Search
CPC .......................... G06F 16/3322; G06F 16/334
See application file for complete search history.

(56) References Cited

U.S. PATENT DOCUMENTS

| | | | |
|---|---|---|---|
| 6,360,215 B1 * | 3/2002 | Judd | G06F 16/951 707/999.009 |
| 7,536,408 B2 | 5/2009 | Patterson | |
| 8,010,545 B2 | 8/2011 | Stefik et al. | |

(Continued)

FOREIGN PATENT DOCUMENTS

| | | |
|---|---|---|
| WO | 0180079 A2 | 10/2001 |
| WO | 2010038923 A1 | 4/2010 |

OTHER PUBLICATIONS

Fan, et al., "Suggesting Topic-Based Query Terms as You Type", In IEEE 12th International Asia-Pacific on Web Conference, Apr. 6, 2010, 7 pages.

(Continued)

*Primary Examiner* — Son T Hoang
(74) *Attorney, Agent, or Firm* — Shook, Hardy & Bacon L.L.P.

(57) ABSTRACT

Representative embodiments disclose mechanisms to complete partial queries entered by a user. Users enter a partial query. The partial query is used to search a short text index comprising the titles of documents. The search yields a list results. The top k entries of the list are selected and a language model is created from the top k entries. The language model comprises n-grams from the top k entries and an associated probability for each n-gram. A query completion generator creates query completion suggestions by matching n-grams with the partial query, removing candidate suggestions that to not comply with suggestion rules, and filtering the remaining suggestions according to a filtering criteria. The top N results are returned as suggestions to complete the query.

20 Claims, 8 Drawing Sheets

(51) Int. Cl.
*G06F 16/335* (2019.01)
*G06F 16/951* (2019.01)

(56) References Cited

U.S. PATENT DOCUMENTS

| | | | |
|---|---|---|---|
| 8,126,863 B2 | 2/2012 | Williams et al. | |
| 8,396,850 B2 | 3/2013 | Schneider | |
| 8,694,483 B2 | 4/2014 | Roulland et al. | |
| 8,924,409 B1 | 12/2014 | Roskind | |
| 8,930,399 B1 | 1/2015 | Das et al. | |
| 9,031,970 B1 * | 5/2015 | Das | G06F 17/276 |
| | | | 707/706 |
| 9,075,898 B1 * | 7/2015 | Ayzenshtat | G06F 16/3322 |
| 2008/0294982 A1 | 11/2008 | Leung et al. | |
| 2011/0047120 A1 | 2/2011 | Kamvar et al. | |
| 2012/0265779 A1 * | 10/2012 | Hsu | G06F 16/3322 |
| | | | 707/767 |
| 2013/0151533 A1 | 6/2013 | Udupa et al. | |
| 2016/0350321 A1 * | 12/2016 | Garg | G06F 16/951 |
| 2017/0192991 A1 * | 7/2017 | Touma | G06F 16/2423 |

OTHER PUBLICATIONS

Bhatia, et al., "Query Suggestions in the Absence of Query Logs", In Proceedings of the 34th international ACM SIGIR conference on Research and development in Information Retrieval, Jul. 24, 2011, pp. 1-10.
"Unsilo Smart Search", https://site.unsilo.com/site/smart-search/, Retrieved on: Dec. 26, 2016, 6 pages.
Mitra, et al., "Query Auto-Completion for Rare Prefixes", In Proceedings of the 24th ACM International Conference on Information and Knowledge Management, Oct. 1, 2015, 1 pages.
"International Search Report and Written Opinion Issued in PCT Application No. PCT/US2018/017147", dated Apr. 24, 2018, 15 Pages.

* cited by examiner

CORPUS SPECIFIC GENERATIVE QUERY COMPLETION ASSISTANT

FIELD

This application relates generally to query systems. More specifically, embodiments disclosed herein include autosuggest and/or autocomplete technology for use in a wide variety of contexts where a system can suggest autocompletion of a query or question.

BACKGROUND

Many systems allow users to enter queries and/or questions (hereafter referred to collectively as queries) into a system for a variety of purposes, such as search, providing instructions to a digital assistant, and so forth. As the user types in the query, the system can monitor the keystrokes and provide a list of suggestions on how the query can be completed. When the user sees a query they are trying to type and/or that they like, they can scroll down and press 'enter' or otherwise indicate that is the query they would like to submit. The goal of autocomplete systems is to eliminate work on the part of the user (i.e., prevent the user from having to type in the complete query).

Modern autosuggest or autocomplete systems memorize the most common queries/questions (hereafter referred to as queries). A probability chain is established where the system predicts the likely next word(s)/term(s) given what has been entered so far.

Modern autocomplete systems typically use a trie data structure for extreme efficiency because the suggestions must be returned in a few milliseconds to avoid disrupting the user's typing pattern. (Suggestions should not be shown substantially slower than user keystroke speed.) A trie is a densely packed tree data structure where each vertex node in the tree contains entries. For query autocomplete purposes, the path to the node is encoded as the series of characters of the query prefix. This approach relies on memorization of past queries that can be stored in the trie, and thus cannot make suggestions when query prefixes are not already stored in the trie.

A variant approach to this one supports simple rotations of terms from the prefix that do have entries in a trie. This extends the coverage beyond exact query prefix matching, but still relies on known queries being stored in the trie. Due to performance considerations, it is not possible to consider all possible permutations of the prefix.

It is within this context that the present embodiments arise.

DETAILED DESCRIPTION

Figure 1:
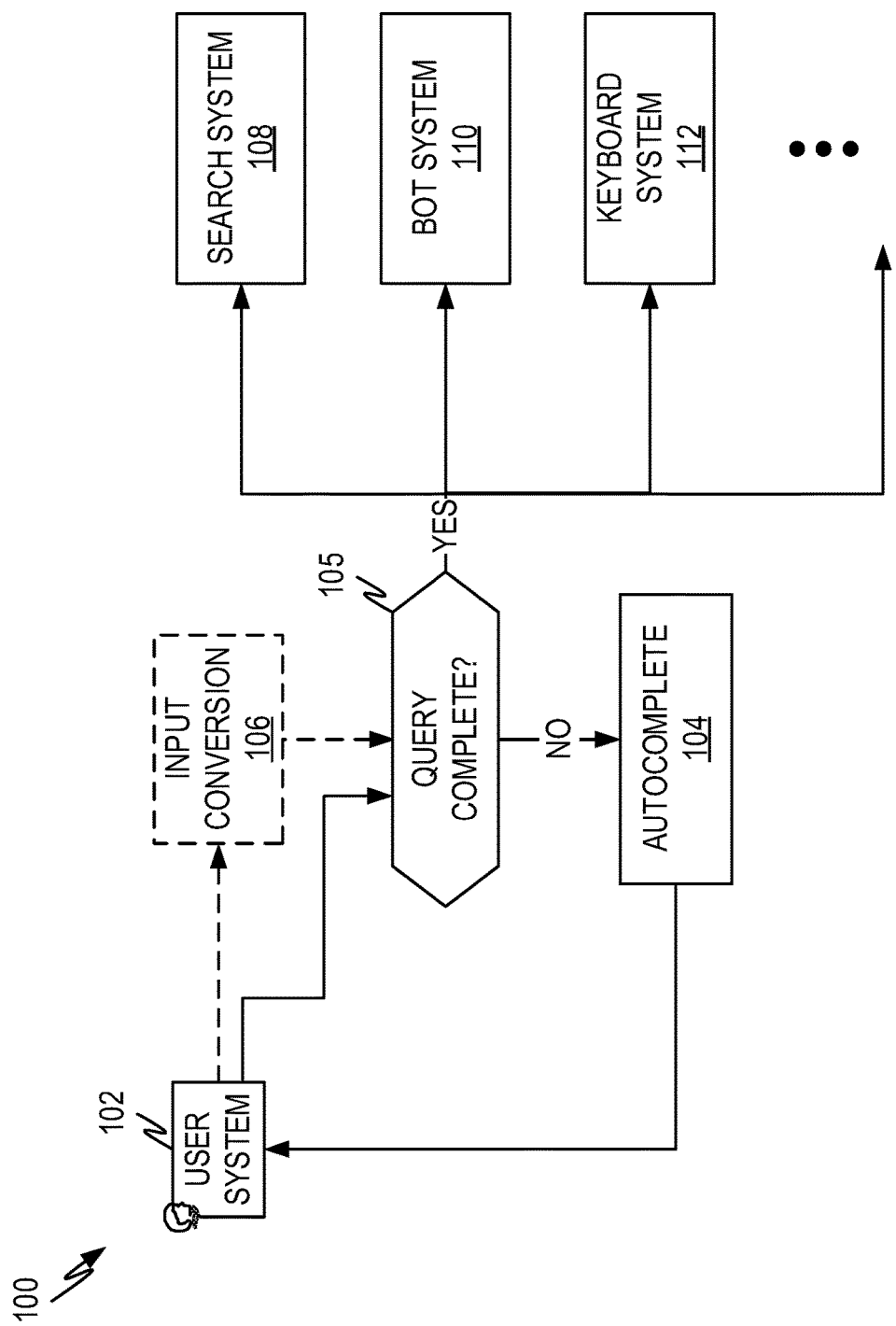
FIG. 1 illustrates an example autocomplete architecture according to aspects of the disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Embodiments of the present disclosure target the "long tail" problem of query completion systems. Query completion systems typically rely on statistics developed from tracking the most frequently utilized queries. However, even large search services like Bing® and/or Google® with vast amounts of history about what queries users enter see somewhere around 15%-20% queries that have never been seen each day. The methods that rely on most frequently utilized queries do not work for these never before seen queries. Environments such as enterprise intranets (i.e., "local search") lack the vast historical context and so traditional methods do not work or work poorly. Furthermore, for local search type systems, the large web search query completion knowledge cannot easily be transferred to the enterprise. Another consideration is that within the local search environment, the vocabulary may be completely different to that of the open web. Thus, even if the large web search query completion knowledge is transferred, it may not be well matched to the internal enterprise content.

There is also an implied promise to a user that when a system suggests a query, such as through autocomplete, that if the user selects and enters the query, that at least one document exists that will be retrieved by the query. Having a system suggest a query that does not retrieve any documents violates this implied promise and leads to frustrated users. Traditional methods that rely on queries the users enter have no way of ensuring that this implied promise is kept (i.e., that a suggested query will retrieve at least some search results) since the traditional approaches only focus on the queries that are entered (i.e., what users are likely to type) rather than on the results that are retrieved.

Embodiments of the present disclosure avoid the problems of traditional approaches by using a corpus of selected documents as the basis for query completion suggestions. The corpus is selected from a larger document set in some instances. The corpus is stored in an index that allows real-time or near real-time search from the corpus. As explained elsewhere, the time limit should be below the average key stroke time.

As a user begins entering a query, a selection component searches the index using the query prefix that has been entered by the user. The index returns a ranked list of short text entries. The list is pruned if there are more than a certain number of entries or the query is expanded if the list has too few entries. The result of these operations is a list of an appropriate length.

A language model is created from n-grams derived from the entries in the list. The language model and the query prefix is passed to a query completion generator. The query completion generator utilizes the language model to create a list of suggested query completion options. The list is formatted and passed to the user via a user interface that allows the user to select one of the list as a query if desired.

DESCRIPTION

Autosuggest/autocomplete systems look at the characters entered by a user and attempt to predict what the user will type next in order to suggest words and/or phrases to complete what the user is typing. In this disclosure, the term autocomplete will be used for the systems, etc. that perform the autosuggest/autocomplete function. Autocomplete systems are useful in any context where a user enters information into a system, such as search systems, chat systems, bot systems, digital assistants, keyboard systems (i.e., where a user enters text such as on a virtual keyboard), and so forth. The text that a user enters will be referred to herein as a query even though the different systems where information is entered may not actually use queries as such. A partial query or prefix will be used herein to refer to that portion of the query that the user has entered so far. The disclosure references a corpus of documents from which a short text index is derived. The term document should be read broadly and can include any type of electronic document, such as web pages, word processing or other text type documents, multi-media documents, and so forth.

FIG. 1 illustrates an example autocomplete architecture 100 according to aspects of the disclosure. This figure illustrates how an autocomplete system according to aspects of the disclosure fits into a representative context. The user begins entering a query through a user system 102. The query can be entered in any format such as text, voice, gesture, and so forth. Generally, autocompletion systems 104 are set up to operate on text information. Thus, if the input is not in a textual format, the input can be converted to text through an input conversion process 106.

The partial query (i.e., prefix) is tested to see if the query is complete (operation 105). If the query is complete, the query is passed to a system which handles the query. Depending on the context, this could be a search system 108, a bot system 110, a keyboard system 112, or any other system. The system can identify a completed query through the press of an enter key, a gesture, or other event that signals that the user is finished entering the query.

Partial queries (i.e., prefixes) are sent to autocompletion system 104 and autocompletion system utilizes the prefix to derive a list of suggestions to complete the prefix and sends them back to the user system 102. Suggestions should be shown in less-than-keystroke time. A typical keystroke speed is around 100 msec., although this time is not absolute because of variations in query entry speed, user perceptions, and so forth. Thus an individual implementation can be tuned to adjust this time until the system feels responsive enough for a typical user, resulting in different processing times for different users. Thus, the operations performed by the autocomplete system 104 should be complete in around 100 msec., or other keystroke time in order to appear to act in "real time" to a user entering a query.

The autocomplete system operates on keystrokes as the user enters the query until the user either completes entering the query (i.e., because the user didn't select any of the suggestions) or until one of the suggestions are selected and entered. At that point, the completed query is forwarded (i.e., operation 105) to one or more systems served by the autocomplete system 104.

Figure 2:
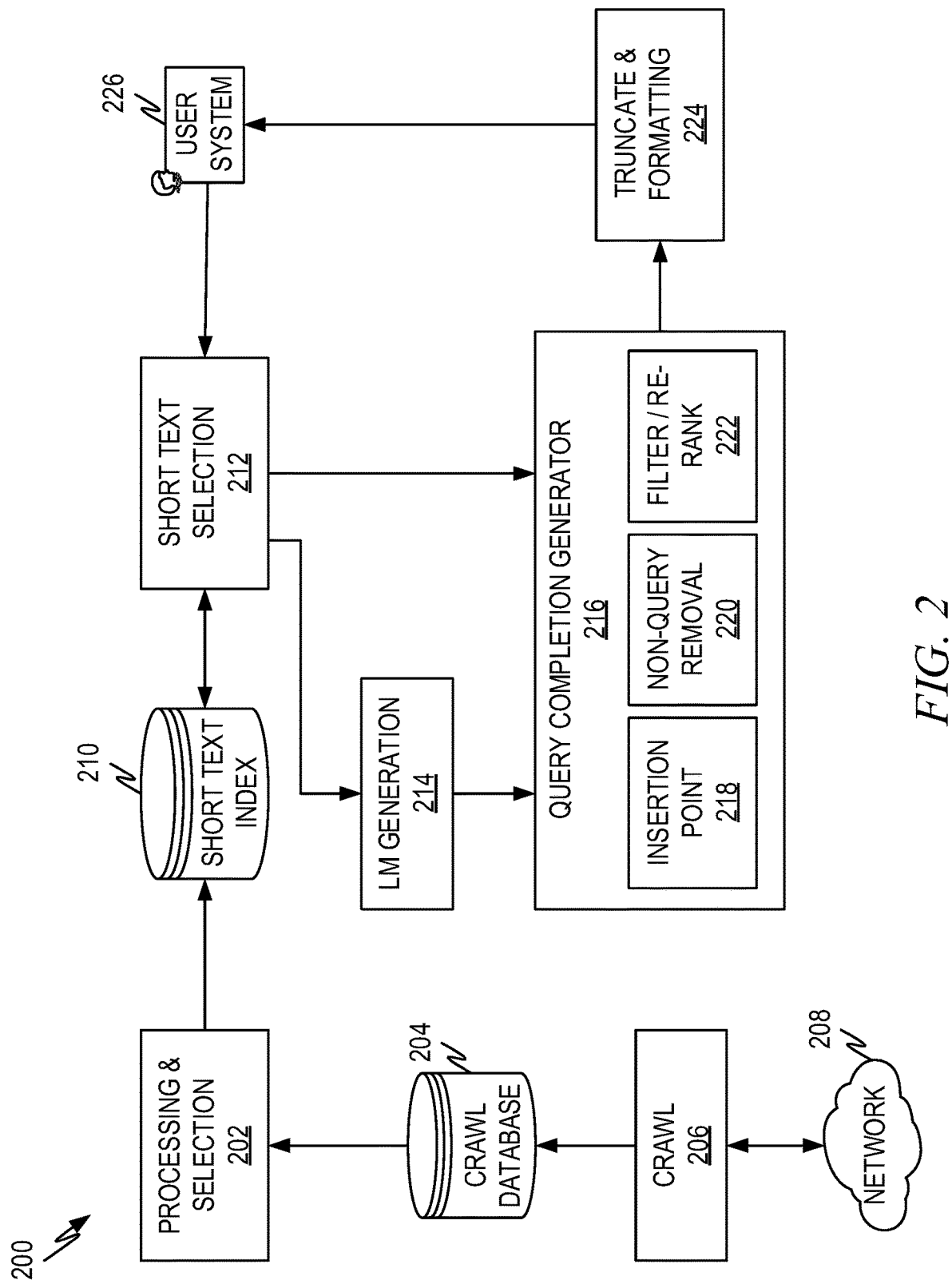
FIG. 2 illustrates an example autocomplete architecture according to aspects of the disclosure.

FIG. 2 illustrates an example autocomplete architecture 200 according to aspects of the disclosure. This architecture 200 could be a representative architecture of the autocomplete system 104 of FIG. 1.

Embodiments of the present disclosure utilize a short text index 210, as discussed below. The short text index comprises entries that are relatively short in length, much shorter than the underlying documents represented by the individual entries. In some embodiments, the short text entries are no longer than about 10 to 15 words in length. In other embodiments, the short text entries are no longer than about 20 to 40 words in length. In yet another embodiment, the short text entries are no longer than about 100 words in length.

Each entry in the index is associated with an underlying document. Various methodologies can be used to derive the short text entry associated with a document. The short text entry should be a summary of the content of the document. In one embodiment, the short text entry is the title of the document. In other embodiments, a summary other than the title can be used if the entry is a short summary (i.e., describes the content of the document within the word length limits) of the underlying document.

The short text index 210 represents a corpus of documents that the autocomplete system will operate over. In other words, suggestions provided by the autocomplete system will retrieve at least some of the underlying documents used to create the short text index 210. Thus, embodiments of the disclosure work particularly well where a corpus of documents are of interest, such as in a corporate environment where corpus can comprise the documents in the corporation.

How the short text index is created depends on the context of how the autocomplete system 200 is implemented. For example, if the system is to be deployed as part of a corporate environment or as part of a private search function (i.e., searching documents behind the corporate firewall) even if implemented in a larger search engine context, then the corpus of documents can be drawn from documents in the corporate environment. If the autocomplete will be part of a larger search engine service, then the corpus of documents can be drawn from the documents identified and indexed by the search engine service. If the autocomplete system is deployed as part of a bot system, a keyboard system, and/or other input system, etc. then the corpus of documents can be those documents most relevant or most likely to be accessed by or referenced by the bot system, keyboard system, etc.

In a representative deployment, a crawl process 206 identifies documents, such as over a network 208. The crawl process 206 can be a web crawler that accesses and identifies documents. The information gathered can be placed, for example, in a crawl database 204. The gathered information can include a variety of information such as the location of where the document can be found, the type of document, metadata such as title, creator, and so forth as well as other information. In large scale search engines, the number of documents identified in the crawl database 204 can be hundreds of billions of documents.

The short text index 210 can be created from information in the crawl database 204 by a processing and selection process 202. The short text index can be based on a subset of the documents identified in the crawl database 204. The documents that will underlie the short text index 210 can be selected based on a variety of criteria, depending on the context and the embodiment. For example, documents can be selected based on one or more of:

A likelihood measure indicating how likely the user will be interested in the document;

A document rank measure;

A document visited measure (i.e. how many times a page or document has been visited);

A measure indicating how likely it is the document will be returned in search results;

A storage location of the document (i.e. documents stored in the main area of a corporation may be of more interest than documents stored in a difficult to access area);

How recently the document has been accessed; and/or

Other metrics/measures.

The subset of documents that form the basis of the short text index 210 can be quite large. For example, in some embodiments, the number of such documents can be 10 billion or more. In a corporate environment, all the documents in the corporation can be included in the subset. Thus the subset of documents that form the basis of the short text index 210 can be all or a part of the documents identified by the crawl database 204.

Figure 3:
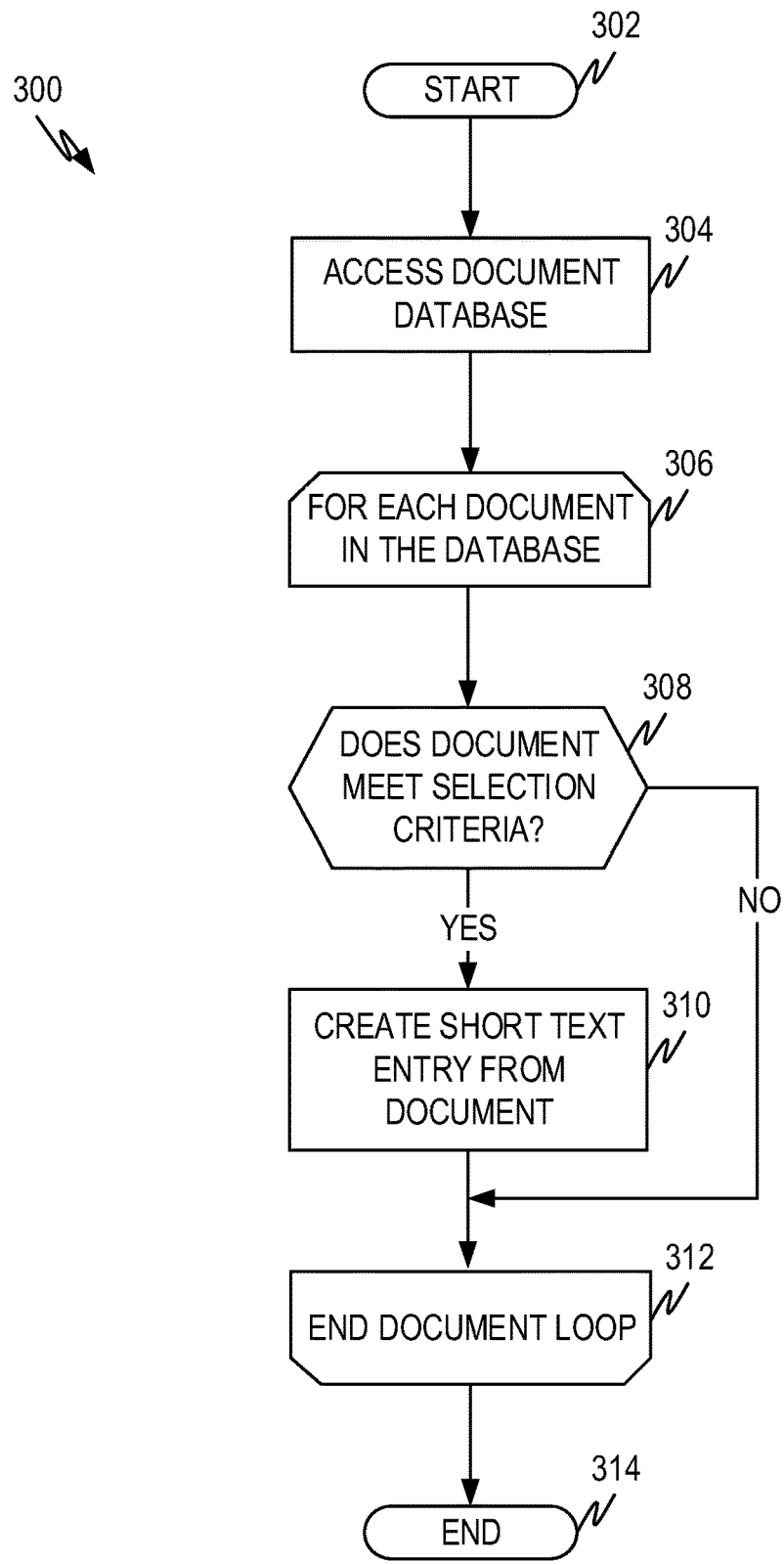
FIG. 3 illustrates a flow diagram for selecting documents to form the basis of the short text index according to aspects of the disclosure.

The processing and selection process 202 sorts through the crawl database (or other database identifying a set of documents) and creates short text entries according to a selection criteria. A representative flow diagram is illustrated in FIG. 3.

Once the short text index 210 has been created, the system is ready to begin accepting queries from the user system 226. The user begins typing or otherwise begins entering a query via the user system 226. This can be as part of a program or app on the user system 226 such as a browser, search dialog box, keyboard, and so forth. As the user enters characters and/or terms they are sent to the short text selection process 212. As indicated in the embodiment of FIG. 1, if the user input is not in text format, the user input can be converted to text, via an input conversion process.

A representative short text selection process 212 is described below in more detail in conjunction with FIG. 4. However, a summary description of the sort text selection process is described here.

The short text selection process 212 uses the partial query entered by the user to search the short text index 210 via a search engine that can search the short text index and return results within the required time period to keep the processing of the overall autocompletion loop within the time needed to return "real time" autocompletion suggestions. Real time means that the user perceives the autocompletion suggestions being returned as the query is being entered. This time is referred to herein as the "keystroke" time, although as noted, entry methods other than keystrokes can be used with the system. As noted above, in some embodiments this can be around 100 msec., although that is representative only and is not a fixed number.

The search engine is designed to handle two cases for the end of the partial query (also referred to as a prefix). As a user types in a prefix, the prefix either ends in a partial term or the prefix ends in a break character, such as a space, indicating the last term in the prefix is a whole term. In the first case, the search engine may be expected to match the partial term to many different terms in the short term index 210. In the latter case, the search engine may be expected to match whole terms only in the short term index 210.

The short text selection process 212 can modify the prefix to indicate which of the two cases the search engine should operate in. For example, if the prefix ends in a partial term, the search engine can append a special character, such as the '*' character to indicate that the final term is partial and that the search engine should match the partial term. If the prefix ends in a whole term, the prefix can remain unchanged, with the possible exception of stripping off the final break character, and the search engine can match whole terms.

The search engine produces a list of short text entries, with each entry having an associated score. The search engine can rank the list in score order using any known ranking method. The short text selection process 212 selects the top k entries and passes the entries to the language model generation process 214. The number of entries, k, that are passed to the language model generation process 214 is a matter of tuning the tradeoff between having more entries to construct the language model while staying within the latency bounds of the user keystroke rate. In some embodiments, k falls somewhere between 10 and 200 entries, although these are representative numbers only. The precise value of k can be ascertained for any given embodiment by experimentally increasing and decreasing k until the response time is within the design value for the user keystroke rate and the language mode is complete enough to give satisfactory autocomplete suggestions. Satisfactory autocomplete suggestions are those suggestions that tend to meet user expectations, which can be measured by how often a user picks one of the autocomplete suggestions.

Depending on the size of the short text index 210, the number of selected short text entries, k, represent a small fraction of the total entries in the short text index 210. However, these entries are associated with documents that are closely aligned with the user's prefix in linguistic content, due to the matching process used to extract the short text entries.

In addition to passing the k short text entries to the language model generation process 214, the short text selection process 212 also passes the prefix to the query completion generator 216.

Figure 5:
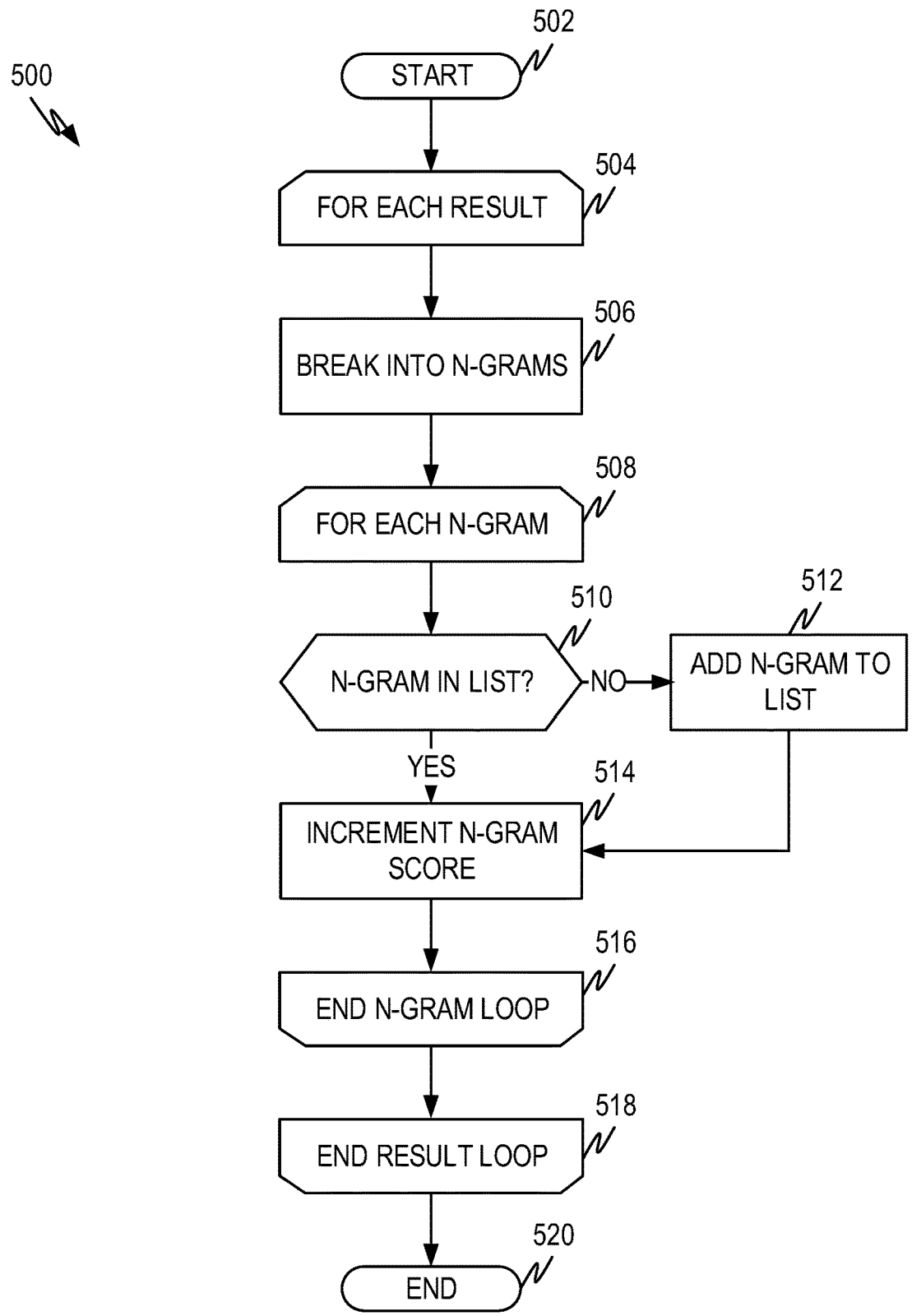
FIG. 5 illustrates a flow diagram for a representative language generation model according to aspects of the disclosure.

Details of a representative language model generation process 214 are described in greater detail in conjunction with FIG. 5. In summary, the language model generation process 214 generates a language model across the short text entries produced by the short text selection process 212. A language model represents a probability distribution over a sequence of words. In this instance, the language model generated by language model generation process 214 represents a probability distribution of the sequence of words in the list of short text entries produced by the short text selection process 212.

One suitable way of generating the language model is to utilize n-grams from the list of short text entries. For efficiency reasons, the maximum size of the n-grams is typically limed to a relative short number, such as 4 or 5. As in the specific number of entries, k, the maximum length of the n-grams is a matter of tuning the tradeoff between having more entries to construct the language model while staying within the latency bounds of the user keystroke rate. The entries in the list of short text entries are broken down into the various n-grams and a score is associated with each n-gram that represents the probability of occurrence of the n-gram in the list. FIG. 5 illustrates a representative method.

As a representative example, suppose that the list of short text entries comprises the titles of documents that includes the following:

"the standard patent examination process: timelines and decisions"

"details of the standard patent examination procedure"

High ranking (i.e., more probable) n-grams from the first entry might include:

"patent examination"
"patent examination process"
"patent examination process timelines"

High ranking n-grams for the second entry might include:

"patent application"
"patent application procedure"

These example n-grams will be used below to show sample query completion examples.

Query completion generator 216 receives the language model and the prefix and generates a list of autocomplete suggestions. There are three main phases to creating the list of autocomplete suggestions. These are the insertion point process 218, the non-query removal process 220 and the filter and re-ranking process 222.

Figure 6:
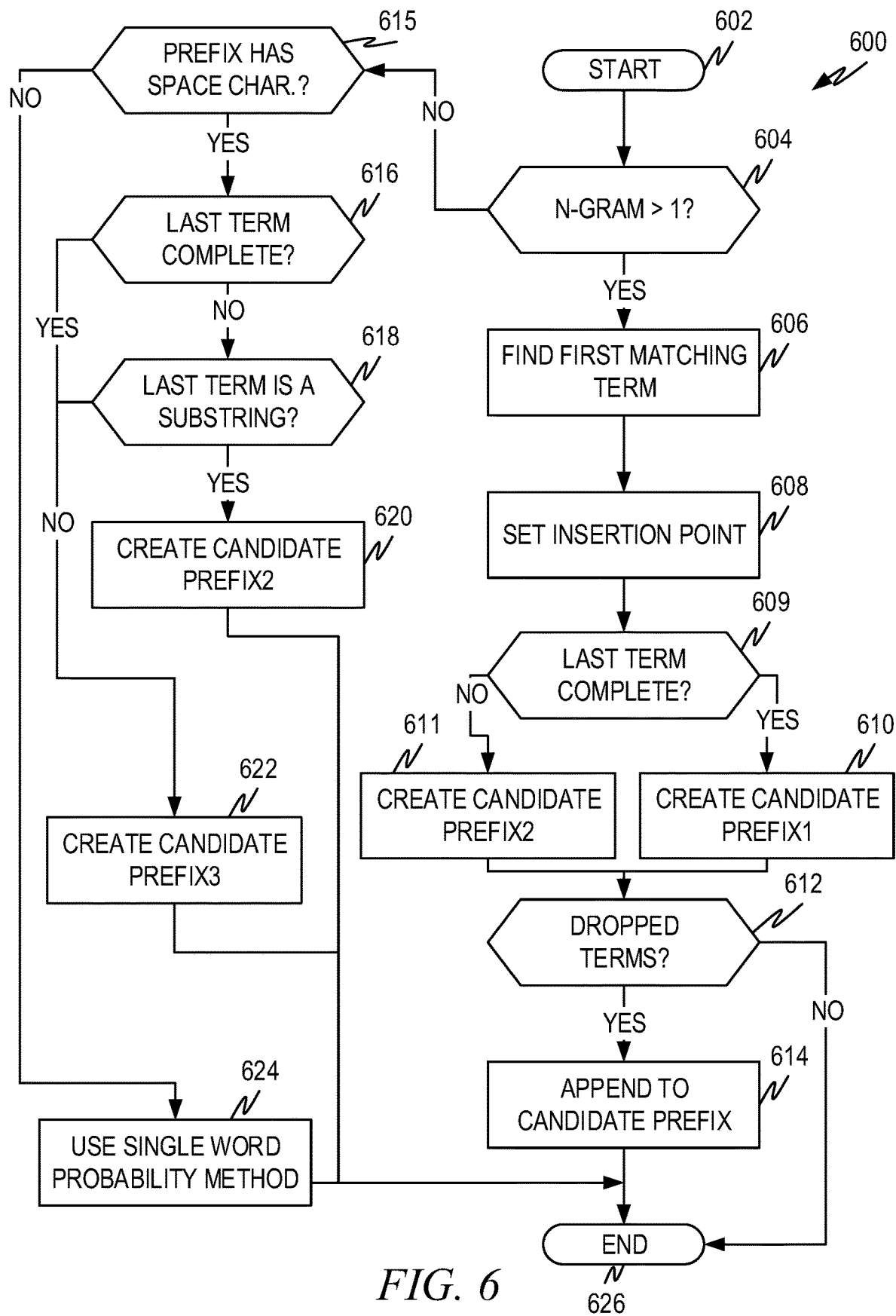
FIG. 6 illustrates a flow diagram for a representative candidate query completion generation method according to aspects of the disclosure.

A representative insertion point process 218 is illustrated in FIG. 6. The insertion point process 218 is performed for the most likely n-grams in the language model. The insertion point process 218 creates a suggestion by merging the prefix and the selected n-gram.

For example, suppose the prefix entered by the user is "standard paten" and the highest ranking n-grams produced by the language model (i.e., from the examples above) include:

"patent examination"
"patent examination process"
"patent examination process timelines"
"patent application"
"patent application procedure"

The insertion process 218 may create from these, autocomplete suggestions of:

"standard patent examination"
"standard patent examination process"
"standard patent examination process timelines"
"standard patent application"
"standard patent application procedure"

Where the underlined portion represents the prefix entered by the user.

The non-query removal process 220 removes autocomplete suggestions that do not look like queries. Depending on the environment, many, if not most, queries entered by users are rarely fully formed natural language expressions. Thus, it is rare that users type search queries that end with a modifier, such as a preposition, conjunction and so forth. Thus, a user would be more likely to type "standard patent examination India" rather than "standard patent examination India and". The latter seems grammatically wrong, even though most search engines would simply ignore the trailing "and". However, because of the way that the autosuggestions are put together, the n-grams produced by an entry in selected from the short text index 210 may well produce an n-gram of "India and" as a high ranking n-gram. This may well result in the autosuggestion of "standard patent examination India and".

To avoid autocomplete suggestions that seem "unquery like" to the user, the non-query removal process 220 comprises a list of stop words, dangling terminators and other words that would not generally terminate a query (collectively stopwords). When these words occur at certain positions of an autocomplete suggestion produced by the insertion point process 218, the autocomplete suggestion is removed. For example, autocomplete suggestions that begin and/or end with stopwords can be removed. As another example, suggestions that begin with one list of stopwords and suggestions that end with a second list of stopwords can be removed. The two lists of stopwords can have overlap between them in this example. A representative list of stopwords can comprise prepositions (e.g., until, by, into after, from, etc.), articles (e.g., a, an, the, and, etc.) and other words that would generally not terminate a query (his, her, their, how, why, where, when, which, etc.).

Figure 7:
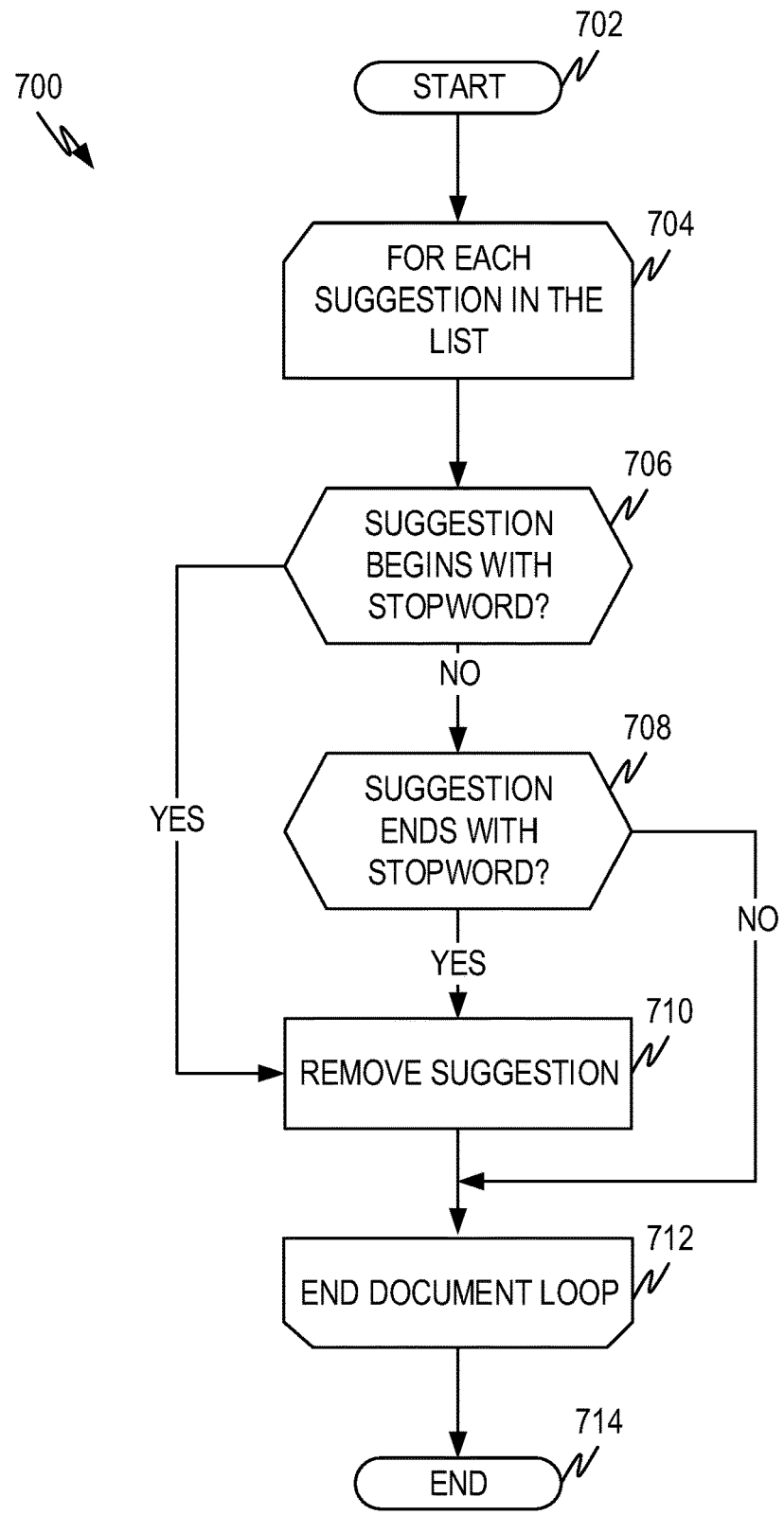
FIG. 7 illustrates a flow diagram for a representative non-query removal method according to aspects of the disclosure.

A representative non-query removal process is illustrated in FIG. 7.

The final operation in the query completion generator 216 is to filter and re-rank the remaining query completion suggestions as illustrated in filter and re-rank process 222. The filter and re-rank process 222 further filters and re-ranks the list of query suggestions based on one or more polices. For example, a policy might state that only one query suggestion should be retained that is derived from each underlying document. Using the examples above, the two documents corresponding to the entries (1) "the standard patent examination process: timelines and decisions" and (2) "details of the standard patent examination procedure" can produce multiple suggestions that are not removed by the non-query removal process 220. As indicated above, these may include:

"standard patent examination"
"standard patent examination process"
"standard patent examination process timelines"
"standard patent application"
"standard patent application procedure"

Where the first three come from document (1) and the last two come from document (2). If the policy states that only one suggestion should be kept from a single underlying document, the above list can be trimmed, only keeping one suggestion for each underlying document. Selection of which suggestion to keep can be based on a variety of other criteria that can come from other policies. For example, a policy may state that suggestions that are longer (i.e., would save the user more typing) should be chosen over suggestions that are shorter. As another example, the inverse may be true (i.e., a policy may state the shorter suggestion should be kept over the longer). As another example, a policy may state to keep the highest scored suggestion (i.e., the suggestion with the highest language model score).

As indicated in the above examples, the ultimate selection can come from a single policy or from the union (or other combination) of multiple polices. In this sense any combination of policies can be used and result in rich selection criteria such as "select if X and Y but not Z".

The ranking portion of the filter and re-ranking process 222 can be combined with, or separate from, the filtering portion of the process. In other words, the ranking criteria can be independent of or part of the filtering criteria. As an example, the filtering criteria may select the longest suggestion from each underlying entry and the ranking criteria may rank the remaining suggestions according to the n-gram probability. Another example, the filtering criteria may select the longest suggestion from each underlying entry and the ranking criteria may rank the remaining suggestions according to the length of the remaining entries (shortest to longest or longest to shortest). Yet another example may rank the suggestions in alphabetical order. In yet further examples, multiple ranking criteria can be used (i.e., rank first by length then alphabetical or vice versa).

The selection of which ranking rules are to be used may depend on the particular environment. For example, a display screen on a mobile device is typically smaller than that of a tablet or laptop computer. For the former, suggestions that are longer than can be reasonably displayed on the display size may be ranked lower than suggestions that are shorter. Such criteria can also be used in filtering the suggestions (i.e., filter out suggestions that are longer than can be reasonably displayed). The filtering criteria and/or re-ranking criteria can include virtually any type of criteria.

In some embodiments, the filtering and re-ranking process 222 also limits the number of suggestions passed to the truncate and formatting process 224. For example, the list can be limited to 20 suggestions in one embodiment. In other embodiments, fewer than 20 or more than 20 suggestions can be used. In still other embodiments, the filtering and/or ranking criteria does not limit the list to a particular number of suggestions and passes all that meet the filtering criteria to the truncate and formatting process 224.

Once the list of suggestions has been filtered and re-ranked according to the desired criteria, the remaining suggestions are passed to truncate and formatting process 224. This process truncates the list of suggestions to the appropriate number for the user system 226, keeping only the top n, suggestions. The number of suggestions, n, is set based on the environment. For example, if the user system 226 is a mobile device, the truncate and formatting process 224 may keep only the top four suggestions. As another example, if the use system 226 is a laptop, desktop or tablet, the truncate and formatting process 224 may keep the top eight suggestions. Communication bandwidth (i.e., between the user system 226 and the autosuggestion system) can be used to set n, with more suggestions being returned on higher bandwidth connections and fewer on lower bandwidth connections. Selecting n is a tradeoff between the number of suggestions that can reasonably be displayed on user system 226 and the time it takes to transfer and display the suggestions.

Whether truncate and formatting process 224 formats the suggestions depends on whether formatting is performed on the autosuggestion side or on the user system side of the communication link. For example, if the suggestions are formatted by an app on the user system 226, the truncate and formatting process 224 need only send down the suggestions in a format that the application understands and leave the UI formatting to the app. If, however, the formatting is performed on the autosuggestion side, such as by an HTML document and/or snippet, then the truncate and formatting process 224 can create the appropriate HTML. As yet another example, the truncate and formatting process 224 can pass the suggestions to yet another component that formats the suggestions prior to sending the suggestions to the user system 226.

FIG. 3 illustrates a representative flow diagram 300 for selecting documents to form the basis of the short text index according to aspects of the disclosure. The method begins at operation 302 and proceeds to operation 304 where the method accesses the document database from which the short text index 214 is to be created. As discussed above, the document database can be the result of a web crawler (and/or other crawler) which can collect metadata about documents.

Operations 306 to 312 form a loop that loops over each document in the database.

Operation 308 identifies whether the document under consideration meets the selection criteria. As discussed above, the selection criteria can include, but is not limited to, one or more of:
  A likelihood measure indicating how likely the user will be interested in the document;
  A document rank measure;
  A document visited measure (i.e. how many times a page or document has been accessed/visited);
  A measure indicating how likely it is the document will be returned in search results;
  A storage location of the document (i.e. documents stored in the main area of a corporation may be of more interest than documents stored in a difficult to access area);
  How recently the document has been accessed; and/or
  Other metrics/measures.

Selection can be made when a score exceeds a threshold. The score can be any of the above measures/metrics, a combination of the above measures/metrics (i.e., combined into a single score as with a weighted sum or weighted average), and/or multiple of the above measures/metrics in any combination (i.e., metric A is above one threshold and metric B is below another threshold, etc.).

If the document meets the criteria (i.e., the "YES" path out of operation 308), the method creates an entry in the short text index from the document in operation 310. Entries in the short text index comprise descriptive text and a score. The score can be any rank, measure, a-priori probability, etc. that indicates a score or ranking of the entry. For example, the score can be the metric associated with the selection criteria. In one example the score can be the score of the selection criteria. For example, if documents are selected based on how recently a document has been accessed, the score can be derived in a way that represents how recent the date of access has been. As another example, if the document is selected based on the number of times the document has been accessed/visited, then the score can be derived from the number of times the document has been accessed/visited. In another example, the score can be different from the selection criteria. For example, documents may be selected based on page rank but scored in the short text index according to one or more selected criteria. Any one or more of the above selection criteria can be the score, either singly or combined in some fashion, such as through a weighted sum or weighted average.

The descriptive text for the short text index can be derived from the document, as previously described. In one example, the title of the document is used as the descriptive text. In other examples, other summaries or abstracts of the documents are used. The descriptive text is relatively short in length, much shorter than the underlying documents represented by the individual entries. In some embodiments, the short text entries are no longer than about 10 to 15 words in length. In other embodiments, the short text entries are no longer than about 20 to 40 words in length. In yet another embodiment, the short text entries are no longer than about 100 words in length. This should not be taken to imply that all entries in the index need to have the same length of descriptive text, although that is certainly possible. These lengths typically represent an upper limit on the length of the descriptive text.

The longer the text entries, the longer it can take the search engine to search through them and return matching entries. Thus, the length of the descriptive text in the short text index entries represents another tradeoff that can be made when tuning the system to ensure operation within the keystroke time of the user.

Operation 312 is the end of the loop over the documents. After all documents have been examined for inclusion into the short text index, the method terminates in operation 314.

Figure 4:
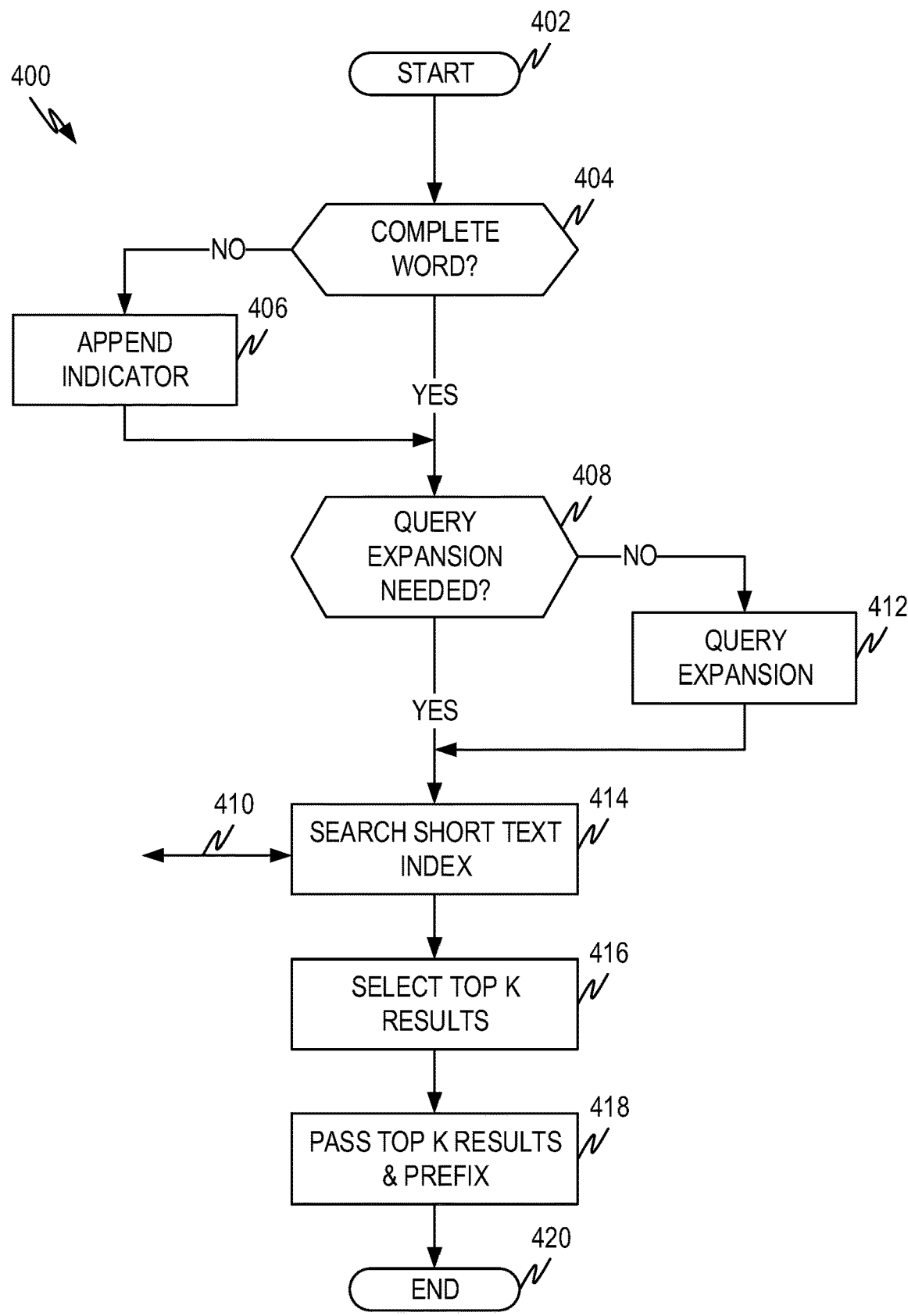
FIG. 4 illustrates a flow diagram for a representative short text selection method according to aspects of the disclosure.

FIG. 4 illustrates a flow diagram 400 for a representative short text selection method according to aspects of the disclosure. The method begins at operation 402 and proceeds to operation 404 where the system identifies whether the last word in the prefix is a complete word. As discussed above, the last term in a prefix is either complete or incomplete. Complete terms can be identified by the presence of a break character (space, punctuation mark, etc.).

If a break character is the last character in the prefix, the last term in the prefix is complete (the "YES" branch from operation 404) and execution can proceed to operation 408. If desired, before proceeding to operation 408, the method can strip the break character from the prefix.

If a break character is not the last character in the prefix, the last term in the prefix is a partial term (the "NO" branch from operation 404) and execution proceeds to operation 406 where a character is appended to the prefix to let the search engine know that the last term is a partial term and that the search engine should perform partial matching on the term. Any character can be used as long as it signals to the search engine to perform partial term matching. A common wildcard character is the '*' or '?' character and so one of these characters can be utilized. Thus, a user entering "ten" with no break character will have an appended '*' by operation 406 and "ten" will be converted to "ten*" indicating the search engine should allow the prefix (ten*) to match "tender," "tense," "tent," "tentacle," and so forth.

After the character is appended in operation 406 of if the last term is complete, execution proceeds to operation 408 where the method identifies whether the predicted results will be sufficient (i.e., whether query expansion is needed). As previously explained, there is a tradeoff between having a sufficient number of entries to create a language model that works well and not having too many entries. Thus, the search engine should produce at least the number of entries (i.e., k entries) that are going to be used to produce the language model. Thus, in operation 408 the number of expected entries returned can be compared to a threshold and if the number equals or exceeds the threshold, the "YES" branch is taken as there are enough results to proceed. The threshold can be set at k or can be higher or lower than k. Determining whether enough results are expected to be returned can be based, for example, on the number of terms in the query (more terms in the prefix can correlate to fewer results), or based on some other criteria such as the number of search results actually returned from the same/similar query in past query completion operation.

If there are insufficient predicted results to create a good language model, the "NO" branch is taken to operation 412 where the prefix is modified to return more results. There are several known methods to broaden a query to return more results and any of these methods can be used, either alone or in combination. For example, terms in the prefix can be stemmed (i.e., replaced with a root term), terms can be dropped from the prefix, and so forth. However, as a query is broadened, search results that are less relevant to what the user is looking for can be introduced. Thus, care can be taken to broaden the query only enough to get sufficient results from the short text index.

If sufficient results are predicted, or after query expansion operation 412, execution proceeds to operation 414 which searches the short text index using the prefix. As noted above, the search engine is tuned to search the short text index and return results within the required time period to keep the processing of the overall autocompletion loop within the time needed to return "real time" autocompletion suggestions. Real time means that the user perceives the autocompletion suggestions being returned as the query is being entered.

As previously discussed, the search engine returns a ranked list of results (i.e., results where each entry comprises a score that can be used for ranking). The score can be used as given from the search engine or the scores can be adjusted or recalculated in some fashion before the search engine returns the scores to the method in operation 414. For example, the a-priori scores associated with the search results can take into account things like page rank, storage location, access time, and so forth. However, the scores can be recalculated and/or adjusted for things the search engine discovers during the searching process. For example, if an entry has a direct match with the prefix the score can be higher than if an entry has match that is not direct (either because the term matches a stem, different term order, and so forth). Thus, the type of match can be used to either set the score or adjust the a-priori scores.

When a sufficient number of results has been obtained and ranked according to the score (if the results to not come pre-ranked from the search engine), the method selects the top k results in operation 416. The number of entries, k, that are passed to the language model generation process 214 is a matter of tuning the tradeoff between having more entries to construct the language model while staying within the latency bounds of the user keystroke rate. In some embodiments, k falls somewhere between 10 and 200 entries, although these are representative numbers only. The precise value of k can be ascertained for any given embodiment by experimentally increasing and decreasing k until the response time is within the design value for the user keystroke rate and the language mode is complete enough to give satisfactory autocomplete suggestions. Satisfactory autocomplete suggestions are those suggestions that tend to meet user expectations, which can be measured by how often a user picks one of the autocomplete suggestions.

The k selected entries are then passed to the language model generation process and the prefix is passed to the query completion generator in operation 418 and the method ends at operation 420.

FIG. 5 illustrates a flow diagram 500 for a representative language generation model according to aspects of the disclosure. This is a representative method that uses n-grams to create the language model. Other language models can also be utilized with embodiments here.

Execution begins at operation 502 and proceeds to operation 504. Operations 504-518 represent a loop across all results returned from the search engine. Thus, if the search engine returns 100 results, the loop will execute across all 100 results.

Operation 506 breaks the entry under consideration into n-grams up to the maximum limit. In breaking the entry into n-grams, some embodiments drop noise words like "the," "and," and so forth. Lists of such noise words are readily available and can be tuned to any particular application with reasonable inquiry. For example, if the entry was "standard patent examination process: timelines and decisions" and the n-gram limit were three (i.e., a 3-gram), the n-grams produced would be:
 1-Grams:
 standard
 patent
 examination
 process
 timelines
 decisions
 2-Grams:
 standard patent
 patent examination
 examination process
 process timelines
 timelines decisions
 3-Grams:
 standard patent examination
 patent examination process
 examination process timelines
 process timelines decisions Operation 508 represents the beginning of a loop (operations 508-516) across all the n-grams created for the entry under consideration. In operation 510, the system tests whether the n-gram under consideration exists in the list. If so, (the "YES" branch), the score for the n-gram is incremented (operation 514). If not, (the "NO" branch) the n-gram is added to the list and the score incremented (operation 514).

Operation 516 closes the n-gram loop and operation 518 closes the result loop. This flow diagram will result in each n-gram in the list having a minimum score of 1 and a maximum score equal to the number of times the n-gram exists in the list of entries. If desired, after all scores are calculated (i.e., after all entries have been processed), the scores can be normalized by the number of entries, by the maximum score, or by some other factor. This operation is not shown in FIG. 5.

The method ends at operation 520.

FIG. 6 illustrates a flow diagram 600 for a representative candidate query completion generation method according to aspects of the disclosure. The method is executed to generate candidate query completion suggestions (also called autocompletion suggestions). The method combines the prefix with the n-grams produced by the language model to generate the autocompletion suggestion candidates and is executed, for example, by the insertion point process 218. As previously discussed, the language model process produces a language model that has a plurality of n-grams along with a score, indicating the frequency of occurrence (i.e., probability of occurrence) of the n-gram in the short text entries selected by the short text selection process. The method can be executed on a subset (i.e., all or part) of the n-grams produced by the language model. In one embodiment, the method is executed on n-grams with a score higher than a given threshold. In another embodiment, all n-grams are used. Although the method 600 is generally executed for multiple n-grams, the discussion below illustrates how the process works on an n-gram. A loop would be created to execute the process across all selected n-grams.

The process begins at operation 602 and execution proceeds to operation 604 where the method tests whether n-gram is a 1-gram or greater than 1-gram (i.e., 2-gram, etc.). If the n-gram is more than a 1-gram, execution proceeds along the "YES" branch to operation 606.

Operation 606 identifies the first matching term in the prefix that matches the first term in the n-gram. If the final term of the prefix is incomplete, then matching the first term includes substring matches. The result of operation 606 can be one of two situations. Either operation 606 found a matching term or it didn't find any matching terms. Thus, if the prefix is "standard patent" and the n-gram was "patent examination procedure," the first matching term would be "patent". If the prefix was incomplete (i.e., "standard pat"), then the first matching term would be where the substrings matched (i.e., "pat"). On the other hand, if the prefix is "standard patent" and the n-gram is "examining procedure," then there are no common matching terms.

Operation 608 sets the insertion point to the matching term. The insertion point is the point at which the n-gram is merged into the prefix. If there are no matching terms, the insertion point is set to the end of the prefix. If a matching term was identified, the insertion point is the position of the first matching term identified in operation 606. In the above examples, the insertion point is placed at the beginning of the matching term "patent" for the first example (prefix="standard patent" and n-gram="patent examining procedure") and at the matching term "pat" for the partial word example (prefix="standard pat" and n-gram="patent examining procedure". For the example where there is no matching terms, the insertion is set at the end of the prefix (prefix="standard patent" and n-gram="examining procedure").

Operation 609 tests whether the last term is complete. If so, the candidate prefix is created by the method described in operation 610 below (i.e., candidate prefix=candidate prefix1). If the last term is not complete (i.e., a partial term), then the candidate prefix is created as described in operation 611 below. (i.e., candidate prefix=candidate prefix2).

If the last term is complete, a candidate prefix is then created in operation 610. The candidate prefix created by operation 610 is labeled candidate prefix1 in the diagram so that it can be distinguished from the way other candidate prefixes are crated in the method. The candidate prefix of operation 610 is created by taking the substring of the prefix from the starting character to the insertion point, adding a space, and adding the n-gram and placing a space at the end. In other words if substring=substring of the prefix from the starting character to the insertion point, then:

Candidate prefix1=substring+space character+gram+space character.

In other embodiments, the last space character can be removed.

If the last term is incomplete, a candidate prefix is then created in operation 611. The candidate prefix created by operation 611 is labeled candidate prefix2 in the diagram so that it can be distinguished from the way other candidate prefixes are crated in the method. The candidate prefix of operation 611 is created by removing the partial term and taking the substring of the prefix from the starting character to the insertion point, adding a space, and adding the n-gram and placing a space at the end. In other words, if partial term=the partial matching substring of the prefix (i.e., at the insertion point), then:

Candidate prefix2=(prefix−partial term)+gram+space character.

In other embodiments, the last space character can be removed.

Once the candidate prefix is created, operation 612 identifies whether there are dropped terms from the prefix. These dropped terms can arise, for example when the first matching term is not at the end of the prefix. For example, if the prefix is "standard patent procedure" and the n-gram is "patent examination" then operation 608 sets the insertion point at "patent" in the prefix and the substring of the prefix is "standard" Candidate prefix would then be calculated as "standard patent examination"="standard"+space+gram+ space. The term "procedure" has been dropped from candidate prefix.

If dropped terms are identified in operation 612, the "YES" branch leads to operation 614 where the dropped terms are appended to the candidate prefix. Thus, in the above example, the candidate prefix would be "standard patent examination" plus the dropped term "procedure" yielding candidate prefix="standard patent examination procedure".

If there are no dropped terms, the "NO" branch leads to operation 626 and the candidate prefix would be equal to the calculated candidate prefix.

For 1-grams, the "NO" branch out of operation 604 leads to operation 615 where the last term of the prefix is tested to see if it contains a space character. If the prefix contains a space character, the prefix has at least one complete term. If there is not at least one complete term (i.e., is a single partial term), then the "NO" branch leads to operation 624 where a different method of dealing with the gram is used. This different method can be, for example, a single word probability method. It is often more effective to utilize a method that includes the single word probability of the gram across a larger language model. In this method, the n-gram will be appended to the prefix if the probability that the n-gram follows the prefix is greater than a threshold probability. In the alternative the 1-gram probability for the existing language model can be utilized.

If the prefix has a space character (i.e., at least one complete term), the "YES" branch leads to operation 616 where the last term in the prefix is tested to see if last term is complete. If the last term is not complete (i.e., a partial term) the "NO" branch leads to operation 618 where the last term is tested to see if it is a substring of the gram.

If the last term is not complete and if the last term is a substring of the gram, then the candidate prefix is calculated as prefix2 (operation 620). In other words, candidate prefix=candidate prefix2=(prefix−last term)+gram.

Otherwise, if the last term is complete or if the last term is not a substring, the candidate prefix is calculated as prefix3 (operation 622). In other words, candidate prefix=prefix3=prefix+gram.

Execution ends at operation 626.

FIG. 7 illustrates a flow diagram 700 for a representative non-query removal method according to aspects of the disclosure. The method is executed, for example, by non-query removal process 220. As discussed above, the method removes autocomplete suggestions that do not look like queries.

Execution begins at operation 702 and proceeds to operation 704. Operations 704-712 represent a loop across each suggestion in the list of candidate query suggestions, i.e., that are created by the method illustrated in FIG. 6.

As discussed above, embodiments can test whether a suggestion begins and/or ends with a stopword on a stopword list. Furthermore, the stopword list for the beginning of the suggestion can be different from, although have overlap with, the stopword list for the end of the suggestion. In the flow diagram of FIG. 6, both the beginning and end of the suggestion are tested for stopwords, although different embodiments may only test the beginning or end and not both. Thus, embodiments may test only the beginning, only the end or both the beginning and the end. For embodiments that don't test both the beginning and the end, appropriate modification of the flow diagram can be made.

Operation 706 tests whether the suggestion under consideration begins with a stopword. As discussed above, to avoid autocomplete suggestions that seem "unquery like" to the user, the stopword list can include stop words, dangling terminators and other words that would not generally terminate a query. A representative list of stopwords can comprise prepositions (e.g., until, by, into after, from, etc.), articles (e.g., a, an, the, and, etc.) and other words that would generally not terminate a query (his, her, their, how, why, where, when, which, etc.) and other words that would not usually be found at the beginning (or end) of a query. Some of these can start a query and be just fine, so the stopword list of operation 706 can allow stopwords that would be seen as "query like" should they begin a query. Often if the second term is a noun, articles may be just fine. In the alternative, any stopword on the list can cause the "YES" branch out of operation 706 to be taken.

If the suggestion under consideration begins with a stopword, the "YES" branch leads to operation 710 where the suggestion is removed from the list of suggestions and the next suggestion is considered (operation 712).

If the suggestion under consideration does not begin with a stopword, the "NO" branch leads to operation 708 where the suggestion is tested to identify whether it ends with a stopword. Again, this list of stopwords can be the same as or different from the list of stopwords used in operation 706. A representative list of stopwords can comprise prepositions (e.g., until, by, into after, from, etc.), articles (e.g., a, an, the, and, etc.) and other words that would generally not terminate a query (his, her, their, how, why, where, when, which, etc.) and other words that would not usually be found at the end (or beginning) of a query.

If the suggestion ends with a stopword, the "YES" branch leads to operation 710 where the suggestion is removed from the list of suggestions and the next suggestion is considered (operation 712). If the suggestion does not end with a stopword, the suggestion remains on the list and the "NO" branch leads to operation 712 for consideration of the next suggestion.

After all suggestions have been considered, execution ends at operation 714 and the list of suggestions contains suggestions that do not begin or end with a stopword.

Example Machine Architecture and Machine-Readable Medium

Figure 8:
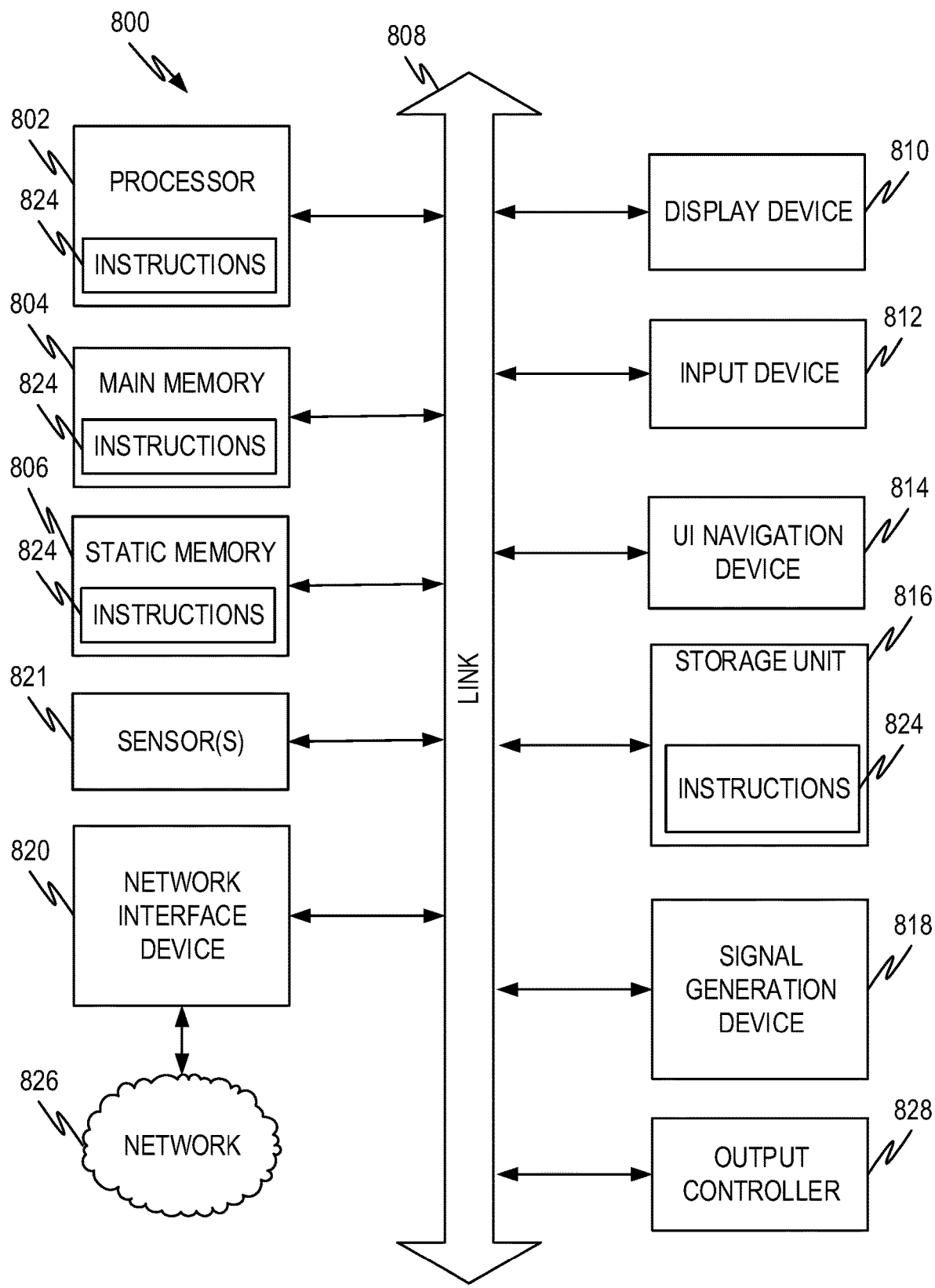
FIG. 8 illustrates a representative machine architecture suitable for implementing the systems and other aspects disclosed herein or for executing the methods disclosed herein.

FIG. 8 illustrates a representative machine architecture suitable for implementing the systems and so forth or for executing the methods disclosed herein. The machine of FIG. 8 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 8 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 800 includes at least one processor 802 (e.g., a central processing unit (CPU), a graphics processing unit (GPU), advanced processing unit (APU), or combinations thereof), one or more memories such as a main memory 804, a static memory 806, or other types of memory, which communicate with each other via link 808. Link 808 may be a bus or other type of connection channel. The machine 800 may include further optional aspects such as a graphics display unit 810 comprising any type of display. The machine 800 may also include other optional aspects such as an alphanumeric input device 812 (e.g., a keyboard, touch screen, and so forth), a user interface (UI) navigation device 814 (e.g., a mouse, trackball, touch device, and so forth), a storage unit 816 (e.g., disk drive or other storage device(s)), a signal generation device 818 (e.g., a speaker), sensor(s) 821 (e.g., global positioning sensor, accelerometer(s), microphone(s), camera(s), and so forth), output controller 828 (e.g., wired or wireless connection to connect and/or communicate with one or more other devices such as a universal serial bus (USB), near field communication (NFC), infrared (IR), serial/parallel bus, etc.), and a network interface device 820 (e.g., wired and/or wireless) to connect to and/or communicate over one or more networks 826.

Executable Instructions and Machine-Readable Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-readable medium," "computer-readable medium" and "device-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media, computer-readable media and/or device-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms machine-readable media, computer-readable media, and device-readable media specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

Example Embodiments

Example 1

A method for completing a query comprising:
receiving, from a user, a query prefix representing a portion of a query;
searching a short text index comprising a plurality of text entries, each entry corresponding to an associated document;
identifying a subset of the plurality of short text entries retrieved from the short text index;
creating a language model from the subset, the language model comprising a plurality of n-grams each with an n-gram probability;
creating a plurality of query completion suggestions based on the language model and the query prefix; and
causing presentation of the plurality of query completion suggestions to the user via a user interface.

Example 2

The method of example 1 wherein the plurality of short text entries each have a probability metric.

Example 3

The method of example 1 wherein each entry in the short text index comprises the title of a document.

Example 4

The method of example 2 wherein identifying the subset comprises:
ranking results returned from the short text index by the probability metric; and
selecting as the subset the top k entries in the ranked list.

Example 5

The method of example 1, 2, 3 or 4 wherein creating the plurality of query completion suggestions comprises:
generating a set of candidate completion suggestions based on the query prefix and the language model;
removing from the set of candidate completion suggestions candidate completion suggestions that do not comply with at least one of a plurality of rules to create a subset of candidate completion suggestions; and
filtering the subset of candidate completion suggestions based on a filter criteria; and
ranking the filtered subset.

Example 6

The method of example 5 wherein the filter criteria selects one candidate completion suggestion associated with an underlying document and removes any other candidate completion suggestions associated with the underlying document.

Example 7

The method of example 5 wherein the filter criteria selects a highest ranked candidate completion suggestion associated with an underlying document and removes any other candidate completion suggestions associated with the underlying document.

Example 8

The method of example 1, 2, 3, or 4 wherein the short text index is created from a subset of documents identified by a second index.

Example 9

The method of example 2 wherein the probability metric associated with an entry is derived from at least one of:
a number of times a document associated with the entry has been viewed;
a type of match between the query prefix and the entry; and
a number of times a document comes up in search results.

Example 10

A system for completing a query comprising:
a processor and executable instructions accessible on a computer-storage medium that, when executed, cause the processor to perform operations comprising:
receive, from a user, a query prefix representing a portion of a query;
search a short text index comprising a plurality of text entries, each entry corresponding to an associated document;
identify a subset of the plurality of short text entries retrieved from the short text index;
create a language model from the subset, the language model comprising a plurality of n-grams each with an n-gram probability;
create a plurality of query completion suggestions based on the language model and the query prefix; and
return plurality of query completion suggestions to the user via a user interface.

Example 11

The system of example 10 wherein the plurality of short text entries each have a probability metric.

Example 12

The system of example 11 wherein identify the subset comprises:
rank results returned from the short text index by the probability metric; and
select as the subset the top k entries in the ranked list.

Example 13

The system of example 10 wherein each entry in the short text index comprises the title of a document.

Example 14

The system of example 10, 11, 12 or 13 wherein creating the plurality of query completion suggestions comprises:
generate a set of candidate completion suggestions based on the query prefix and the language model;
remove from the set of candidate completion suggestions candidate completion suggestions that do not comply with at least one of a plurality of rules to create a subset of candidate completion suggestions; and
filter the subset of candidate completion suggestions based on a filter criteria; and
rank the filtered subset.

Example 15

The system of example 14 wherein the filter criteria selects one candidate completion suggestion associated with an underlying document and removes any other candidate completion suggestions associated with the underlying document.

Example 16

The system of example 14 wherein the filter criteria selects a highest ranked candidate completion suggestion associated with an underlying document and removes any other candidate completion suggestions associated with the underlying document Example 17

A computer storage medium comprising executable instructions that, when executed by a processor of a machine, cause the machine to perform operations comprising:
receive, from a user, a query prefix representing a portion of a query;
search a short text index comprising a plurality of text entries, each entry comprising the title of an associated document;
identify a subset of the plurality of short text entries retrieved from the short text index;
create a language model from the subset, the language model comprising a plurality of n-grams each with an n-gram probability;
create a plurality of query completion suggestions based on the language model and the query prefix; and
return plurality of query completion suggestions to the user via a user interface.

Example 18

The medium of example 17 wherein the plurality of short text entries each have a probability metric derived from at least one of:
a number of times a document associated with the entry has been viewed;
a type of match between the query prefix and the entry; and
a number of times a document comes up in search results.

Example 19

The medium of example 17 or 18 wherein creating the plurality of query completion suggestions comprises:
generate a set of candidate completion suggestions based on the query prefix and the language model;
remove from the set of candidate completion suggestions candidate completion suggestions that do not comply with at least one of a plurality of rules to create a subset of candidate completion suggestions; and filter the subset of candidate completion suggestions based on a filter criteria; and
rank the filtered subset.

Example 20

The medium of example 19 wherein the filter criteria selects one candidate completion suggestion associated with an underlying document and removes any other candidate completion suggestions associated with the underlying document.

Example 21

A method for completing a query comprising:
receiving, from a user, a query prefix representing a portion of a query;
searching a short text index comprising a plurality of text entries, each entry corresponding to an associated document;
identifying a subset of the plurality of short text entries retrieved from the short text index;
creating a language model from the subset, the language model comprising a plurality of n-grams each with an n-gram probability;
creating a plurality of query completion suggestions based on the language model and the query prefix; and
causing presentation of the plurality of query completion suggestions to the user via a user interface.

Example 22

The method of example 21 wherein the plurality of short text entries each have a probability metric.

Example 23

The method of example 21 or 22 wherein each entry in the short text index comprises the title of a document.

Example 24

The method of example 22 wherein identifying the subset comprises:
ranking results returned from the short text index by the probability metric; and
selecting as the subset the top k entries in the ranked list.

Example 25

The method of example 21, 22, 23 or 24 wherein creating the plurality of query completion suggestions comprises:
generating a set of candidate completion suggestions based on the query prefix and the language model;
removing from the set of candidate completion suggestions candidate completion suggestions that do not comply with at least one of a plurality of rules to create a subset of candidate completion suggestions; and
filtering the subset of candidate completion suggestions based on a filter criteria; and
ranking the filtered subset.

Example 26

The method of example 25 wherein the filter criteria selects one candidate completion suggestion associated with an underlying document and removes any other candidate completion suggestions associated with the underlying document.

Example 27

The method of example 25 wherein the filter criteria selects a highest ranked candidate completion suggestion associated with an underlying document and removes any other candidate completion suggestions associated with the underlying document.

Example 28

The method of example 25 wherein the filter criteria comprises removing candidate completion suggestions that begin with a stopword or removing candidate completion suggestions that end with a stopword or both.

Example 29

The method of example 21, 22, 23, or 24 wherein the short text index is created from a subset of documents identified by a second index.

Example 30

The method of example 22 wherein the probability metric associated with an entry is derived from at least one of:
a number of times a document associated with the entry has been viewed;
a type of match between the query prefix and the entry; and
a number of times a document comes up in search results.

Example 31

The method of example 21, 22, 23, 24, 25, 26, 27, 28, 29 or 30 wherein the plurality of short text entries each have a probability metric derived from at least one of:
a number of times a document associated with the entry has been viewed;
a type of match between the query prefix and the entry; and
a number of times a document comes up in search results.

Example 32

The method of example 21, 22, 23, 24, 25, 26, 27, 28, 29, 30 or 31 further comprising expanding a query used to retrieve the plurality of short text entries when a number of short text entries retrieved from the short text index is less than a threshold number.

Example 33

The method of example 21, 22, 23, 24, 28, 29, 30, 31 or 32 wherein creating the plurality of query completion suggestions comprises:
identifying a plurality of n-grams from the language model;
identifying an insertion point in the query prefix;
generating a set of candidate completion suggestions by combining each of the plurality of n-grams from the language model with the prefix at the insertion point.

Example 34

An apparatus comprising means to perform a method as in any preceding example.

Example 35

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for completing a query comprising:
   receiving, from a user, a query prefix representing a portion of the query;
   creating a search string from the query prefix;
   searching a short text index using the search string to retrieve a plurality of text entries, each entry corresponding to a title of an associated document;
   identifying a subset of the plurality of text entries retrieved from the short text index;
   creating a language model from the subset, the language model comprising a plurality of n-grams corresponding to the subset, the plurality of n-grams associated with an n-gram probability determined based at least in part on the short text index;
   creating a plurality of query completion suggestions based on the language model and the query prefix by at least merging the plurality of n-grams with the query prefix based on an insertion point associated with the query prefix; and
   causing presentation of the plurality of query completion suggestions to the user via a user interface, wherein at least one of the plurality of query completion suggestions returns a result matching the query.

2. The method of claim 1, wherein a text entry of the plurality of text entries is associated with a probability metric.

3. The method of claim 2, wherein the identifying the subset comprises:
   ranking results returned from the short text index by the probability metric; and
   selecting, as the subset, the top k entries in the ranked results.

4. The method of claim 2, wherein the probability metric associated with an entry is derived from at least one of:
   a number of times a document associated with the entry has been viewed;
   a type of match between the query prefix and the entry; and
   a number of times a document comes up in search results.

5. The method of claim 1, wherein the search string comprises the query prefix.

6. The method of claim 1, wherein the creating the plurality of query completion suggestions comprises:
   generating a set of candidate completion suggestions based on the query prefix and the language model;
   removing, from the set of candidate completion suggestions, candidate completion suggestions that do not comply with at least one of a plurality of rules to create a subset of candidate completion suggestions; and
   filtering the subset of candidate completion suggestions based on a filter criterion; and
   ranking the filtered subset.

7. The method of claim 6, wherein the filter criterion selects one candidate completion suggestion associated with an underlying document and removes any other candidate completion suggestions associated with the underlying document.

8. The method of claim 6, wherein the filter criterion selects a highest ranked candidate completion suggestion associated with an underlying document and removes any other candidate completion suggestions associated with the underlying document.

9. The method of claim 1, wherein the short text index is created from a subset of documents identified by a second index.

10. A system for completing a query comprising:
    a processor and executable instructions accessible on a computer-storage medium that, when executed, cause the processor to perform operations comprising:
    receiving, from a user, a query prefix representing a portion of the query;
    creating a search string from the query prefix;
    searching a short text index using the search string to retrieve a plurality of text entries, each entry corresponding to a title of an associated document;
    identifying a subset of the plurality of text entries retrieved from the short text index;
    creating a language model from the subset, the language model comprising a plurality of n-grams corresponding to the subset, the plurality of n-grams associated with an n-gram probability determined based at least in part on the short text index;
    creating a plurality of query completion suggestions based at least in part on the language model and the query prefix by at least merging the plurality of n-grams with the query prefix based on an insertion point associated with the query prefix; and
    return plurality of query completion suggestions to the user via a user interface, wherein at least one of the returned query completion suggestions returns a result matching the query.

11. The system of claim 10, wherein a text entry of the plurality of text entries is associated with a probability metric.

12. The system of claim 11, wherein the identifying the subset comprises:
    ranking results returned from the short text index by the probability metric; and
    selecting, as the subset, the top k entries in the ranked results.

13. The system of claim 10, wherein the query string comprises the query prefix.

14. The system of claim 10, wherein the creating the plurality of query completion suggestions comprises:
    generating a set of candidate completion suggestions based on the query prefix and the language model;
    removing, from the set of candidate completion suggestions, candidate completion suggestions that do not comply with at least one of a plurality of rules to create a subset of candidate completion suggestions; and
    filtering the subset of candidate completion suggestions based on a filter criterion; and
    ranking the filtered subset.

15. The system of claim 14, wherein the filter criterion selects one candidate completion suggestion associated with an underlying document and removes any other candidate completion suggestions associated with the underlying document.

16. The system of claim 14, wherein the filter criterion selects a highest ranked candidate completion suggestion associated with an underlying document and removes any other candidate completion suggestions associated with the underlying document.

17. A computer readable medium comprising executable instructions that, when executed by a processor of a machine, cause the machine to perform operations comprising:
receiving, from a user, a query prefix representing a portion of the query;
searching a short text index based on the query prefix to retrieve a plurality of text entries, each entry comprising a title of an associated document;
identifying a subset of the plurality of text entries retrieved from the short text index;
creating a language model from the subset, the language model comprising a plurality of n-grams corresponding to the subset, the plurality of n-grams associated with an n-gram probability determined based at least in part on the short text index;
creating a plurality of query completion suggestions based on the language model and the query prefix by at least merging the plurality of n-grams with the query prefix based on an insertion point associated with the query prefix; and
returning the plurality of query completion suggestions to the user via a user interface, wherein at least one of the returned query completion suggestions returns a result matching the query.

18. The medium of claim 17, wherein the plurality of text entries each having a probability metric derived from at least one of:
a number of times a document associated with the entry has been viewed;
a type of match between the query prefix and the entry; and
a number of times a document comes up in search results.

19. The medium of claim 17, wherein creating the plurality of query completion suggestions comprises:
generating a set of candidate completion suggestions based on the query prefix and the language model;
removing, from the set of candidate completion suggestions, candidate completion suggestions that do not comply with at least one of a plurality of rules to create a subset of candidate completion suggestions; and
filtering the subset of candidate completion suggestions based on a filter criterion; and
ranking the filtered subset.

20. The medium of claim 19, wherein the filter criterion selects one candidate completion suggestion associated with an underlying document and removes any other candidate completion suggestions associated with the underlying document.

* * * * *